US012645620B2

(12) United States Patent
Tsao et al.

(10) Patent No.: US 12,645,620 B2
(45) Date of Patent: Jun. 2, 2026

(54) CROSS-DIE INTERCONNECTION MONITOR METHOD AND CROSS-DIE INTERCONNECTION MONITOR SYSTEM CAPABLE OF EXTRACTING CROSS-DIE INTERCONNECTION DATA FOR MULTI-DIE PACKAGES

(71) Applicant: MEDIATEK INC., Hsinchu City (TW)

(72) Inventors: Po-Chao Tsao, Hsinchu City (TW);
Tung-Hsing Lee, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 22 days.

(21) Appl. No.: 18/946,951

(22) Filed: Nov. 14, 2024

(65) Prior Publication Data

US 2025/0173286 A1    May 29, 2025

Related U.S. Application Data

(60) Provisional application No. 63/603,696, filed on Nov. 29, 2023.

(51) Int. Cl.
*G06F 13/20*        (2006.01)

(52) U.S. Cl.
CPC .......... *G06F 13/20* (2013.01); *G06F 2213/40* (2013.01)

(58) Field of Classification Search
CPC ............................ G06F 13/20; G06F 2213/40
See application file for complete search history.

(56) References Cited

U.S. PATENT DOCUMENTS

| | | | | |
|---|---|---|---|---|
| 6,463,570 B1 * | 10/2002 | Dunn | ...................... | H01L 22/14 |
| | | | | 257/E21.531 |
| 2014/0143748 A1 * | 5/2014 | Bickford | ................. | G06F 30/30 |
| | | | | 716/134 |
| 2022/0179950 A1 * | 6/2022 | Aschauer | ................. | G09C 1/00 |

OTHER PUBLICATIONS

M. Vertregt et al., "Ring-oscillator test-structures for sub-0.1% accuracy wafer-level characterization of active- and standby current consumption, variability, and fast aging of oscillation frequencies," 2017 ICMTS, Grenoble, France, 2017, pp. 1-6, doi: 10.1109/ICMTS. 2017.7954266. (Year: 2017).*

* cited by examiner

*Primary Examiner* — Eric T Oberly
(74) *Attorney, Agent, or Firm* — Winston Hsu

(57)                ABSTRACT
A cross-die interconnection monitor method includes providing a first die and a second die, embedding an intra-die detector into the first die for detecting a first feature of the first die, allocating a first inter-die detector from the first die to the second die for detecting a second feature between the first die and the second die, and comparing the first feature with the second feature for generating cross-die interconnect data from the first die to the second die by a neural network.

20 Claims, 4 Drawing Sheets

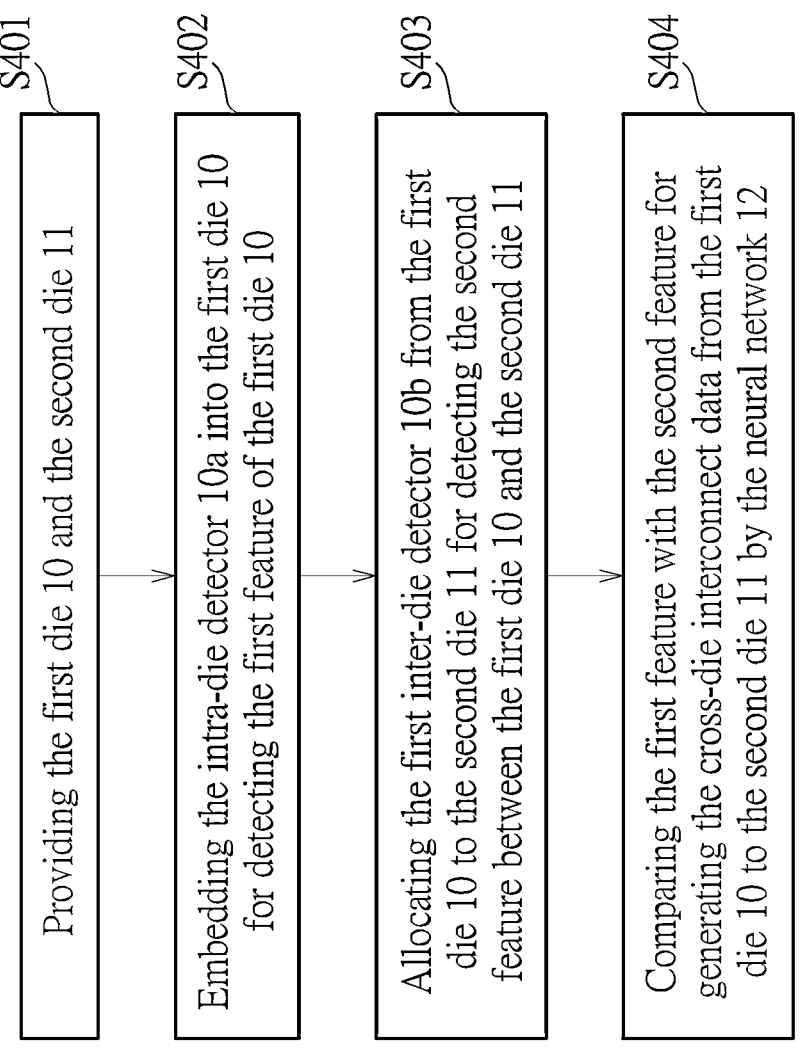

S401

Providing the first die 10 and the second die 11

S402

Embedding the intra-die detector 10a into the first die 10 for detecting the first feature of the first die 10

S403

Allocating the first inter-die detector 10b from the first die 10 to the second die 11 for detecting the second feature between the first die 10 and the second die 11

S404

Comparing the first feature with the second feature for generating the cross-die interconnect data from the first die 10 to the second die 11 by the neural network 12

FIG. 4

CROSS-DIE INTERCONNECTION MONITOR METHOD AND CROSS-DIE INTERCONNECTION MONITOR SYSTEM CAPABLE OF EXTRACTING CROSS-DIE INTERCONNECTION DATA FOR MULTI-DIE PACKAGES

CROSS REFERENCE TO RELATED APPLICATIONS

This application claims the benefit of U.S. Provisional Application No. 63/603,696, filed on Nov. 29, 2023. The content of the application is incorporated herein by reference.

BACKGROUND

With the rapid advancement of technologies, various chips and integrated circuits (ICs) are adopted in our daily life. Therefore, high quality and low operational risk ICs are required for various electronic applications. In a silicon testing flow, to provide high quality and low operational risk ICs, outlier ICs are identified and labeled by analyzing measured testing data.

While it is possible to identity outlier ICs, the die-to-die interconnections play a crucial role in the performance of multi-die package. For example, if the impedance of the die-to-die interconnections does not match the target impedance, it may lead to a degradation in performance. Currently, it is hard to measure cross-die interconnection data or performance in the multi-die package since a foundry only provides wafer acceptance test (WAT) data.

Therefore, developing a cross-die interconnection monitor system is an important issue.

SUMMARY

In an embodiment of the present invention, a cross-die interconnection monitor method is disclosed. The cross-die interconnection monitor method comprises providing a first die and a second die, embedding an intra-die detector into the first die for detecting a first feature of the first die, allocating a first inter-die detector from the first die to the second die for detecting a second feature between the first die and the second die, and comparing the first feature with the second feature for generating cross-die interconnect data from the first die to the second die by a neural network.

In another embodiment of the present invention, a cross-die interconnection monitor system is disclosed. The cross-die interconnection monitor system comprises a first die, a second die, an intra-die detector embedded into the first die, a first inter-die detector allocated from the first die to the second die, and a neural network coupled to the intra-die detector and the first inter-die detector. The intra-die detector is used for detecting a first feature of the first die. The first inter-die detector is used for detecting a second feature between the first die and the second die. The neural network compares the first feature with the second feature for generating cross-die interconnect data from the first die to the second die.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a flow chart of performing a cross-die interconnection monitor method by the cross-die interconnection monitor system in FIG. 1.

DETAILED DESCRIPTION

Figure 1:
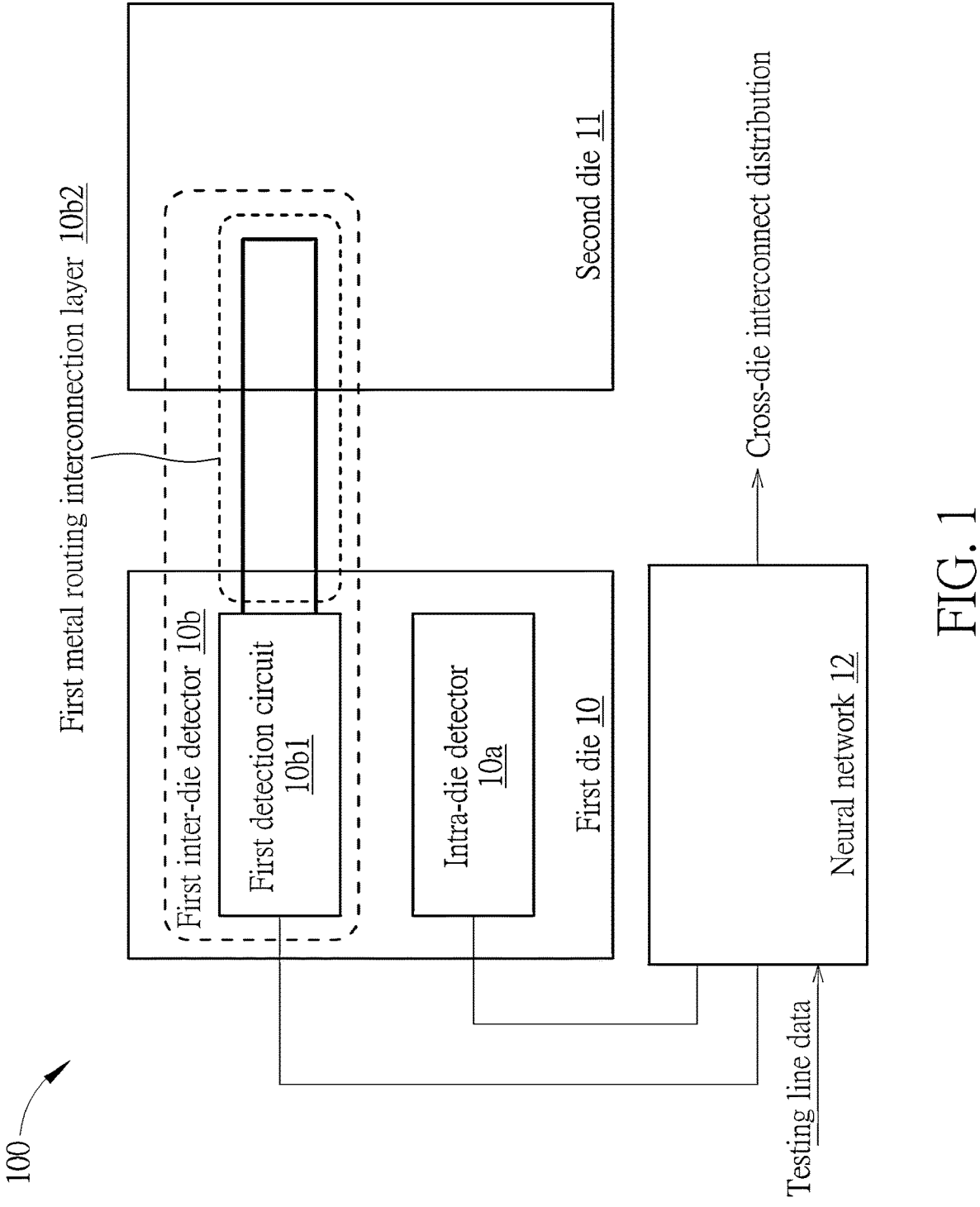
FIG. 1 is a block diagram of a cross-die interconnection monitor system according to an embodiment of the present invention.

FIG. 1 is a block diagram of a cross-die interconnection monitor system 100 according to an embodiment of the present invention. The cross-die interconnection monitor system 100 includes a first die 10, a second die 11, an intra-die detector 10a, a first inter-die detector 10b, and a neural network 12. The intra-die detector 10a is embedded into the first die 10. The first inter-die detector 10b is allocated from the first die 10 to the second die 11. The neural network 12 is coupled to the intra-die detector 10a and the first inter-die detector 10b. The intra-die detector 10a and the first inter-die detector 10b can include ring oscillator detectors. Therefore, the intra-die detector 10a and the first inter-die detector 10b can be used for detecting frequency differences for different dies. Here, since the intra-die detector 10a is embedded into the first die 10, the intra-die detector 10a can be used for detecting a first feature of the first die 10. Further, the first inter-die detector 10b can include a first detection circuit 10b1 and a first metal routing interconnection layer 10b2. The first detection circuit 10b1 is embedded into the first die 10. The first metal routing interconnection layer 10b2 is allocated as a metal loop circuit from the first die 10 to the second die 11. Therefore, the first inter-die detector 10b can be used for detecting a second feature between the first die 10 and the second die 11. The neural network 12 can be any artificial intelligence (AI) based architecture, such as a convolutional neural network (CNN) or a recurrent neural network (RNN). Further, the neural network 12 can establish a training model for comparing the first feature with the second feature for inferring cross-die interconnect data from the first die 10 to the second die 11.

In the cross-die interconnection monitor system 100, as previously mentioned, when the intra-die detector 10a and the first inter-die detector 10b include ring oscillator detectors, the first feature and the second feature can be two frequency signals. For example, the intra-die detector 10a can detect a first frequency signal of the first die 10. The first inter-die detector 10b can detect a second frequency signal affected by the first die 10 and the second die 11. Further, the cross-die interconnect data from the first die 10 to the second die 11 can be resistor-capacitor (RC) interconnect data from the first die 10 to the second die 11. However, the present invention is not limited thereto. The neural network 12 can infer the RC interconnect data from the first die 10 to the second die 11 according to differences between the first frequency signal and the second frequency signal.

In the cross-die interconnection monitor system 100, a length of the first metal routing interconnection layer 10b2 of the first inter-die detector 10b can be adjustable. For example, a length L1 of the first metal routing interconnection layer 10b2 can be used for detecting a frequency F1 affected by the first die 10 and the second die 11. A length L2 of the first metal routing interconnection layer 10b2 can be used for detecting a frequency F2 affected by the first die 10 and the second die 11. Specifically, different lengths of the first metal routing interconnection layers result in different detecting frequencies. Therefore, in the cross-die interconnection monitor system 100, when a plurality of first inter-die detectors 10b with different lengths of first metal routing interconnection layers are introduced, the neural network 12 can detect at least one additional second feature between the first die 10 and the second die 11. As a result, the neural network 12 can infer accurate cross-die interconnect data.

Figure 2:
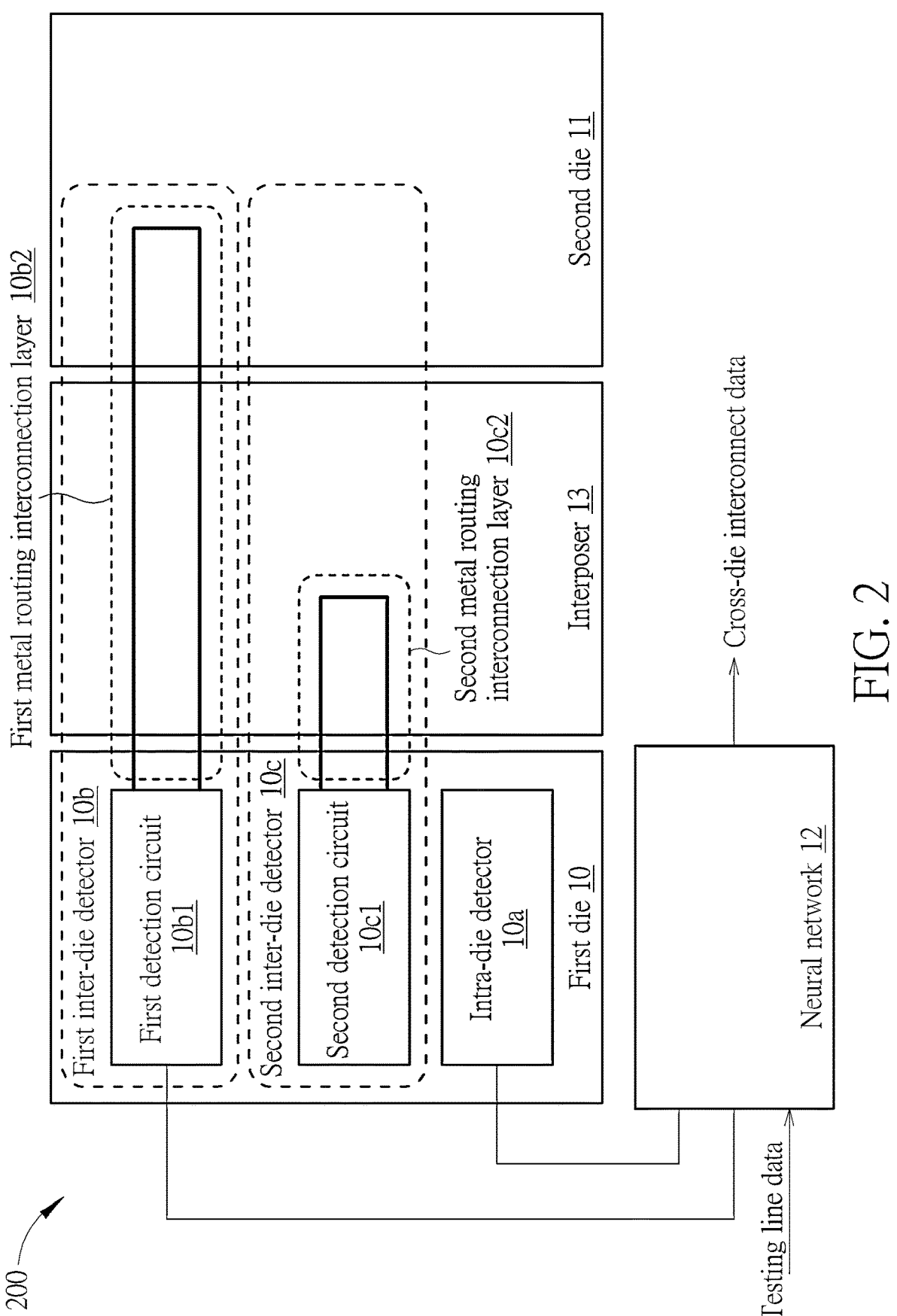
FIG. 2 is a block diagram of a cross-die interconnection monitor system according to another embodiment of the present invention.

FIG. 2 is a block diagram of a cross-die interconnection monitor system 200 according to another embodiment of the present invention. For avoiding ambiguity, the cross-die interconnection monitor system in FIG. 2 is called as a cross-die interconnection monitor system 200 hereafter. The cross-die interconnection monitor system 200 includes a first die 10, a second die 11, an intra-die detector 10a, a first inter-die detector 10b, a second inter-die detector 10c, a neural network 12, and an interposer 13. The intra-die detector 10a is embedded into the first die 10. The first inter-die detector 10b is allocated from the first die 10 to the second die 11. The second inter-die detector 10c is allocated from the first die 10 to the interposer 13. Here, the second inter-die detector 10c includes a second detection circuit 10c1 and a second metal routing interconnection layer 10c2. The second detection circuit 10c1 is embedded into the first die 10. The second metal routing interconnection layer 10c2 is allocated as a second metal loop circuit from the first die 10 to the interposer 13. Here, the interposer 13 is disposed between the first die 10 and the second die 11. The neural network 12 is coupled to the intra-die detector 10a, the first inter-die detector 10b, and the second inter-die detector 10c. In the cross-die interconnection monitor system 200, the second inter-die detector 10c is allocated from the first die 10 to the interposer 13 for detecting a third feature between the first die 10 and the interposer 13. The interposer 13 can be used for linking the first die 10 and the second die 11. As previously mentioned, the neural network 12 can compare the first feature with the second feature for generating the cross-die interconnect data from the first die 10 to the second die 11. Similarly, the neural network 12 can compare the first feature with the third feature for generating interconnect data from the first die 10 to the interposer 13. It should be understood that the cross-die interconnect data can be generated by using a bi-directional detection mechanism. For example, the intra-die detector 10a can be embedded into the second die 11. The first inter-die detector 10b can be allocated from the second die 11 to the first die 10. Therefore, the neural network 12 can infer cross-die interconnect data from the second die 11 to the first die 10. Further, the cross-die interconnection monitor system 100 or 200 is not limited to detecting a pair-wised die interconnect data. For example, data of N cross-die interconnects from the first die 10 to N second dies 11 can be inferred by the neural network 12 when N first inter-die detectors 10b are introduced. N can be any positive integer. Any reasonable technology or hardware modification falls into the scope of the present invention.

Figure 3:
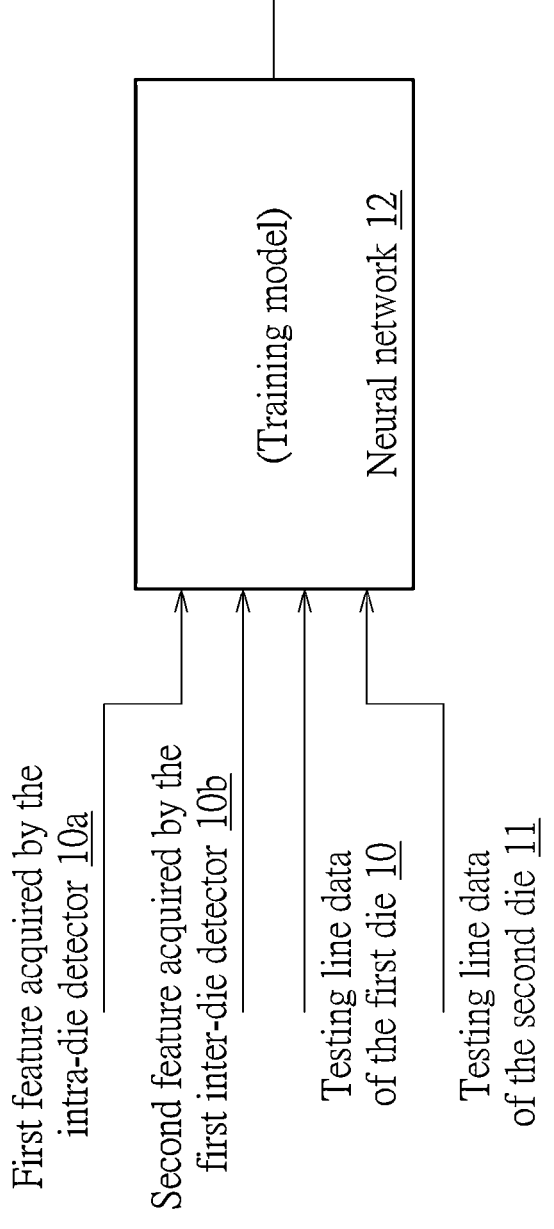
FIG. 3 is an illustration of inferring cross-die interconnect data by a neutral network of the cross-die interconnection monitor system in FIG. 1.

FIG. 3 is an illustration of inferring the cross-die interconnect data by the neutral network 12 of the cross-die interconnection monitor system 100. The neutral network 12 can receive the first feature acquired by the intra-die detector 10a and the second feature acquired by the first intra-die detector 10b. Further, the neural network 12 can receive testing line data of the first die 10 and the second die 11. The testing line data of the first die 10 and the second die 11 can be used for assisting the neural network 12 to generate the cross-die interconnect data. In the embodiment, the testing line data of the first die 10 and the second die 11 can be acquired from a chip probe (CP) stage node, a final test (FT) stage node, or a wafer acceptance test (WAT) stage node. After the training model is fully trained by the neutral network 12, the neutral network 12 can use the training model for inferring the cross-die interconnect data accordingly. It should be understood that the neutral network 12 can perform an on-line interfering stage or an off-line interfering stage, depending on its computing power. After the cross-die interconnect data is generated for all dies of a wafer, the neural network 12 can generate a cross-die interconnect distribution of a wafer map. For example, the neural network 12 can generate a cross-die interconnect distribution of RC data of a wafer map. Therefore, the neural network 12 can select at least two dies from the wafer map for generating a multi-die package according to the cross-die interconnect distribution.

FIG. 4 is a flow chart of performing a cross-die interconnection monitor method by the cross-die interconnection monitor system 100. The cross-die interconnection monitor method can include step S401 to step S404. Any hardware or technology modification falls into the scope of the present invention. Step S401 to step S404 are illustrated below.

step S401: providing the first die 10 and the second die 11;

step S402: embedding the intra-die detector 10a into the first die 10 for detecting the first feature of the first die 10;

step S403: allocating the first inter-die detector 10b from the first die 10 to the second die 11 for detecting the second feature between the first die 10 and the second die 11;

step S404: comparing the first feature with the second feature for generating the cross-die interconnect data from the first die 10 to the second die 11 by the neural network 12.

Details of step S401 to step S404 are previously illustrated. Thus, they are omitted here. In the cross-die interconnection monitor system 100, all combinations of cross-die interconnect patterns can be detected by using inter-die detectors and intra-die detectors. Since the cross-die interconnect data can be acquired by the neural network 12, appropriate die groups can be selected for generating the multi-die package. Since the RC interconnect data of the selected die groups matches an RC requirement previously defined, the cross-die interconnection monitor system 100 can increase operational performance of the multi-die package.

To sum up, the present invention discloses a cross-die interconnection monitor method and a cross-die interconnection monitor system. The cross-die interconnection monitor system incorporates at least one inter-die detector and at least one intra-die detector for generating cross-die interconnect data from one die to at least one other die. Further, the cross-die interconnection monitor system generates a cross-die interconnect distribution of a wafer map. Utilizing the cross-die interconnect distribution makes it straightforward to pinpoint unsuitable die combinations when a multi-die package fails to meet the anticipated performance. Further, the cross-die interconnection monitor system can select at least two dies from the wafer map for generating a multi-die package having expected performance according to the cross-die interconnect distribution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cross-die interconnection monitor method comprising:
   providing a first die and a second die;
   embedding an intra-die detector into the first die for detecting a first feature of the first die;
   allocating a first inter-die detector from the first die to the second die for detecting a second feature between the first die and the second die; and
   comparing the first feature with the second feature for generating cross-die interconnect data from the first die to the second die by a neural network.

2. The method of claim 1, wherein the intra-die detector and the first inter-die detector are ring oscillator detectors, and the first feature and the second feature comprise frequency signals.

3. The method of claim 1, wherein the cross-die interconnect data from the first die to the second die, is resistor-capacitor (RC) interconnect data from the first die to the second die.

4. The method of claim 1, wherein the first inter-die detector comprises a first detection circuit and a first metal routing interconnection layer, the first detection circuit is embedded into the first die, and the first metal routing interconnection layer is allocated as a first metal loop circuit from the first die to the second die.

5. The method of claim 4, further comprising:
   adjusting a length of the first metal routing interconnection layer; and
   detecting at least one additional second feature between the first die and the second die.

6. The method of claim 1, further comprising:
   allocating a second inter-die detector from the first die to an interposer for detecting a third feature between the first die to the interposer;
   wherein the interposer is disposed between the first die and the second die, and the interposer is used for linking the first die and the second die.

7. The method of claim 6, further comprising:
   comparing the first feature with the third feature for generating interconnect data from the first die to the interposer by the neural network.

8. The method of claim 1, further comprising:
   acquiring testing line data of the first die and the second die; and
   inputting the testing line data of the first die and the second die to the neural network for assisting the neural network to generate the cross-die interconnect data.

9. The method of claim 8, wherein the testing line data of the first die and the second die, is testing line data of the first die and the second die acquired from a chip probe (CP) stage node, a final test (FT) stage node, or a wafer acceptance test (WAT) stage node.

10. The method of claim 1, further comprising:
    generating a cross-die interconnect distribution of a wafer map by the neural network; and selecting at least two dies from the wafer map for generating a multi-die package according to the cross-die interconnect distribution.

11. A cross-die interconnection monitor system comprising:
    a first die;
    a second die;
    an intra-die detector embedded into the first die;
    a first inter-die detector allocated from the first die to the second die; and
    a neural network coupled to the intra-die detector and the first inter-die detector;
    wherein the intra-die detector is used for detecting a first feature of the first die, the first inter-die detector is used for detecting a second feature between the first die and the second die, and the neural network compares the first feature with the second feature for generating cross-die interconnect data from the first die to the second die.

12. The system of claim 11, wherein the intra-die detector and the first inter-die detector are ring oscillator detectors, and the first feature and the second feature comprise frequency signals.

13. The system of claim 11, wherein the cross-die interconnect data from the first die to the second die, is resistor-capacitor (RC) interconnect data from the first die to the second die.

14. The system of claim 11, wherein the first inter-die detector comprises a first detection circuit and a first metal routing interconnection layer, the first detection circuit is embedded into the first die, and the first metal routing interconnection layer is allocated as a metal loop circuit from the first die to the second die.

15. The system of claim 14, wherein a length of the first metal routing interconnection layer is adjustable, and the neural network detects at least one additional second feature between the first die and the second die.

16. The system of claim 11, further comprising:
    a second inter-die detector; and
    an interposer disposed between the first die and the second die;
    wherein the second inter-die detector is allocated from the first die to the interposer for detecting a third feature between the first die to the interposer, and the interposer is used for linking the first die and the second die.

17. The system of claim 16, wherein the neural network compares the first feature with the third feature for generating interconnect data from the first die to the interposer.

18. The system of claim 11, wherein the neural network acquires testing line data of the first die and the second die, and the testing line data of the first die and the second die is used for assisting the neural network to generate the cross-die interconnect data.

19. The system of claim 18, wherein the testing line data of the first die and the second die, is testing line data of the first die and the second die acquired from a chip probe (CP) stage node, a final test (FT) stage node, or a wafer acceptance test (WAT) stage node.

20. The system of claim 11, wherein the neural network generates a cross-die interconnect distribution of a wafer map, and the neural network selects at least two dies from the wafer map for generating a multi-die package according to the cross-die interconnect distribution.

* * * * *